Nov. 8, 1949  F. A. G. KOENIG  2,487,342
COMPUTING MACHINE
Filed March 20, 1947  3 Sheets-Sheet 1
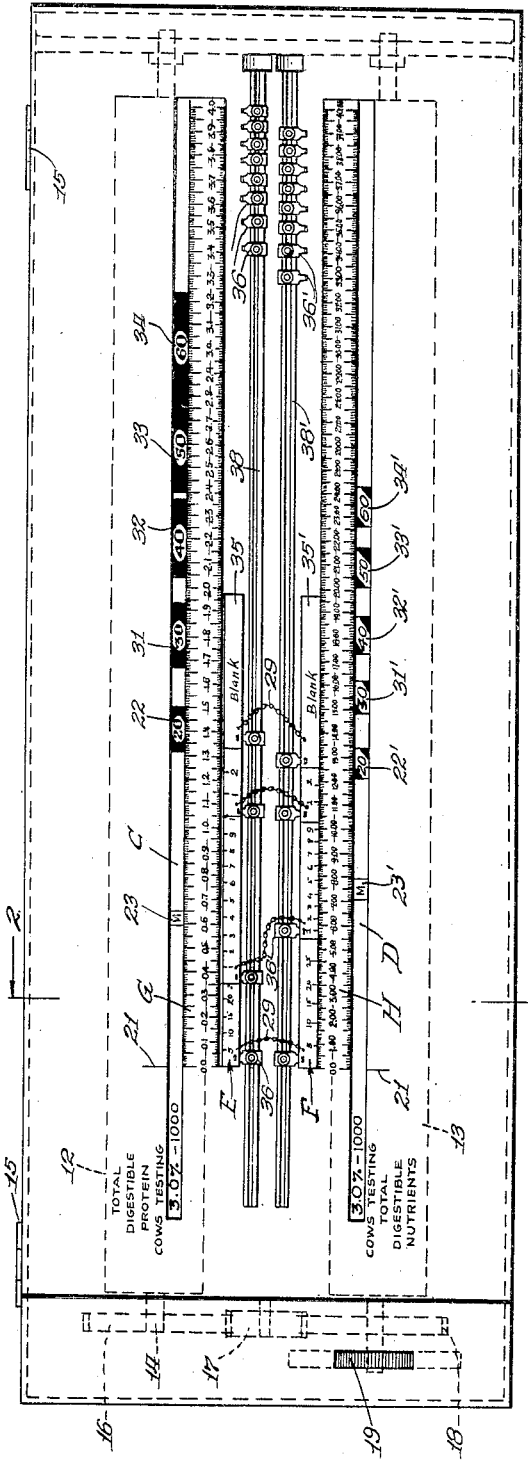
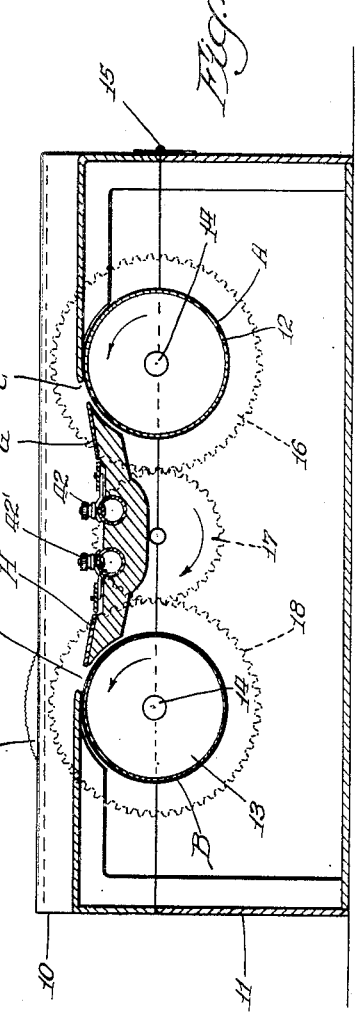
INVENTOR.
Frederick A. G. Koenig
BY
Harvey M. Gillespie
Atty.

Nov. 8, 1949  F. A. G. KOENIG  2,487,342
COMPUTING MACHINE
Filed March 20, 1947  3 Sheets-Sheet 2

INVENTOR.
Frederick A. G. Koenig
BY
Harvey M. Gillespie
Atty

INVENTOR.
Frederick A. G. Koenig
BY
Harvey M. Gillespie
Atty.

Patented Nov. 8, 1949

2,487,342

UNITED STATES PATENT OFFICE 2,487,342

COMPUTING MACHINE

Frederick A. G. Koenig, Chicago, Ill., assignor to Anna C. Koenig, Chicago, Ill.

Application March 20, 1947, Serial No. 736,054

11 Claims. (Cl. 235—69)

This invention relates to new and useful improvements in computing machines and has for one of its principal objects the provision of simplified means for selectively displaying any one of a plurality of problems to be solved and to provide mechanical computing elements representing quantities entering into the solution of said problem, which computing elements are adapted to be selectively arranged to vary their respective per cent values in the computation.

The invention is adapted for use in various situations. However, it is illustrated herein in connection with the preparation of suitable rations for dairy cattle. It is therefore a specific object of the invention to provide a machine of the character above mentioned including means for selectively indicating the nutrient requirements of dairy cattle in relation to their individual weights, milk production, and the percentage of butter fat contained in the milk and to also provide computing elements representing the feeds used in the ration, which elements are adjustable relative to the data displayed so as to vary their respective per cent values in the ration.

Another and more specific object of the invention includes the provision, in a computing machine of the above character, an adjustable graph showing certain data relative to the animal for which a ration is being prepared and showing the amount of nutrient required to stimulate the growth of the animal and/or increase its marketable products and to provide in connection with said graph computing elements useable individually or conjointly to indicate the percentage of certain nutrients contained in a feed and also the total digestible nutrients contained therein.

The invention may be briefly described as comprising an adjustable chart positioned to display the problem to be solved, a series of computing elements adapted to be selectively arranged relative to each other to cooperate with the disclosure of the chart, and fixed scales for indicating the percentage values of the computing elements which enter into the solution of the problem.

In the present disclosure, the chart is made into two parts designated A and B and are mounted upon revolvable cylinders. The said cylinders are positioned to display the desired data in a pair of windows C and D. The data displayed in the window C relates to the classification of the animal and shows the amount of a prescribed nutrient, for example protein, required in a daily ration to properly nourish the animal. The data displayed in the window D indicates the required total digestible nutrients required to provide a suitable ration for an animal of the classification specified.

The computing elements for solving the problem disclosed are preferably arranged in two groups E and F and are in the form of scales representing different feeds having various percentages of nutrients therein. The scales of group E are provided with graduations to show the percentage of protein contained in the feeds represented by the group and the scales of group F are graduated to show the total digestible nutrients of said feeds. The computing scales are, therefore, preferably used in pairs and may be permanently connected for this purpose, one scale showing the protein content of a feed and the other showing the total digestible nutrients of the same feed.

As an alternative the computing scales can be graduated to show the calories, vitamins, minerals, or other known measures of nutrient values instead of the measures herein indicated. The invention, therefore, is not limited to the production of a stock ration.

The computing scales of the separate groups are preferably arranged in overlapped relation adjacent fixed scales G and H which are graduated to indicate the percentage value of each of the feeds or other quantities which are used to satisfy the requirements disclosed on the chart.

The invention includes as a further object, the provision of a computing machine constructed and adapted to operate in the manner briefly described.

The principles of the invention are illustrated in the specific form of mechanism shown in the accompanying drawings wherein:

Fig. 1 is a plan view of a computing machine constructed in accordance with this invention.

Fig. 2 is a cross sectional view taken on line 2—2 of Fig. 1.

Fig. 3 is a fragmentary view of a chart indicating the protein requirements of certain classes of milch cows.

Fig. 4 is a fragmentary view of a chart showing the total digestible nutrients required in a ration for cows of the same classification indicated in Fig. 3.

Figure 5:
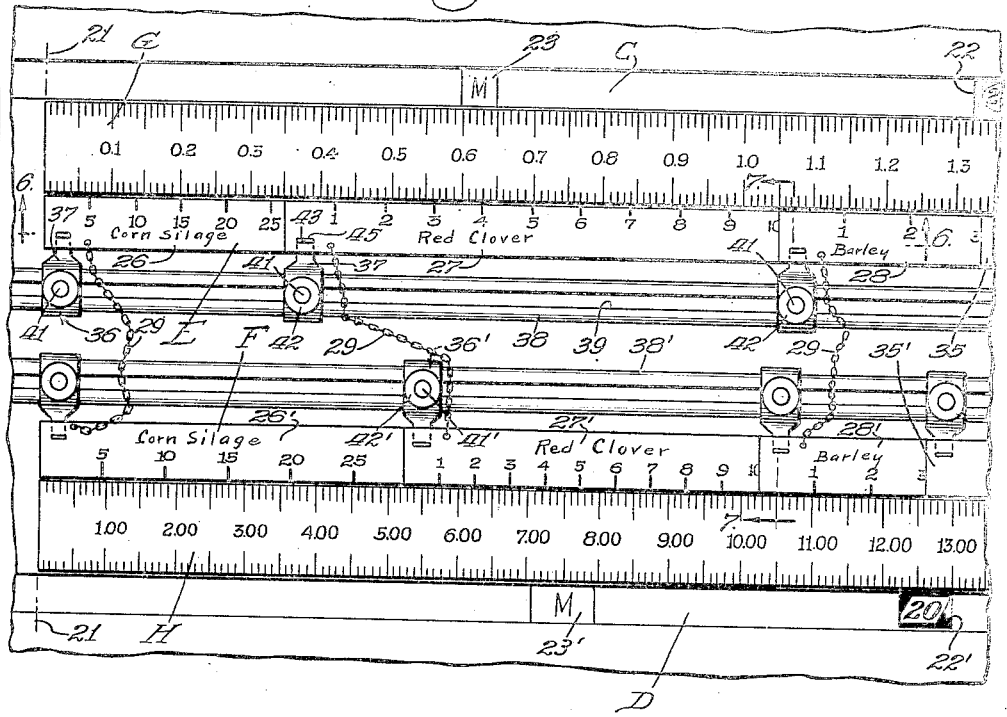
Fig. 5 is an enlargement of a portion of the plan view shown in Fig. 1.

Referring to the drawings: 10 and 11 designates the upper and lower portions respectively of a housing for enclosing a pair of cylinders 12 and 13, each of which is provided at its opposite ends with trunnions 14—14 which are journaled in suitable bearings in the housing. The upper and lower portions of the housing are hinged as indicated at 15 on a line passing horizontally through said trunnions so that the upper section may be opened to permit the removal of the cylinders 12 and 13. The cylinders are operatively connected so that the movement of one cylinder imparts corresponding movement to the other. This operative connection includes a gear 16 secured to trunnion 14 of the cylinder 12 which meshes with an idle pinion 17. This pinion meshes with a gear 18 secured to the end trunnion of the cylinder 13. An operating wheel 19 is also secured to the last mentioned trunnion and projects upwardly out of the housing so that it can be manually turned in either forward or reverse directions and thereby impart corresponding movements to both of the cylinders 12 and 13.

Positioned on the cylinders 12 and 13 are charts A and B which contain classification data including the weight of the cow for which a ration is being prepared, her daily milk production and the percentage of butter fat contained in the milk. In view of the fact that this data varies for different animals of like weight, the cows producing milk having the same percentage of butter fat are arranged in separate groups. For example, cows of different weights which produce milk containing three per cent (3%) butter fat are arranged in one group X and the cows producing milk containing three and one-half per cent (3.5%) butter fat are arranged in another group designated Y. These classifications can be obviously extended to cover the full range of butter fat percentages.

In each group classification, the cows are individually classified as to their weight and as to their daily milk production. For example, the group of cows producing milk containing three per cent (3%) butter fat may include all cows of different weight and producing different quantities of milk. The same is true also of the other groups of higher or lower butter fat rating.

The above data for cows of different weights is arranged in parallel spaces corresponding in width and length to the width and length of window openings C and D formed in the upper section of the housing. Consequently the data relating for cows of known weight and butter fat classification will be disclosed in the said windows.

The volume of milk produced by cows of the same weight and butter fat rating may vary considerably. These production ratings are indicated by legend blocks spaced from each other lengthwise of the windows C and D; the legends 20, 30, 40, etc., represent the pounds of milk produced daily. The various blocks representing different production ratings are spaced at different distances from a common starting index designated 21 and aligned with the left-hand ends of fixed scales G and H. The distance between the starting index 21 and the several production ratings correspond to percentage measures of a predetermined linear value. These percentage values are indicated by the graduations on the fixed scales G and H which extend along the said windows. For example, the graduations indicating a milk production of 20 pounds for a cow weighing 1,000 pounds and having three per cent (3%) butter fat rating is indicated opposite the blocks 22 which are arranged in both windows C and D. The position of the block 22 in window C relative to the starting index 21 indicates the amount of protein required to properly nourish a cow weighing 1,000 pounds and producing 20 pounds of milk containing three per cent (3%) butter fat. It will be seen by inspection of Figs. 1 and 5 that the said block extends from graduation 1.32 on the fixed scale G to graduation 1.51. This is an indication that a cow of the above class when producing 20 pounds of milk will require from 1.32 to 1.51 pounds of protein in her daily ration. The block designated 23 in window C is spaced from the starting index 21 a distance representing the amount of protein required by the animal for her maintenance when she is not producing. That is to say, when a cow of 1,000 pounds having a three per cent (3%) butter fat rating is not producing milk, it requires 0.6 to 0.65 pounds of protein in a ration to maintain the animal in proper physical condition.

The production ratings 22' and 23' on chart B are spaced different distances from the starting index 21 and indicate respectively the amount of total digestible nutrients required by the said cow weighing 1,000 pounds and producing milk containing three per cent (3%) butter fat. The block designated 22' indicates the amount of total digestible nutrients required when the cow is producing 20 pounds of milk per day and the block designated 23' indicates the amount of total digestible nutrients required by the said animal when she is not producing milk. These said amounts expressed in pounds are indicated by the graduations on the adjacent fixed scale H as being from 12.22 pounds to 13.45 pounds. The position of the block 23' relative to the graduations on the scale H indicates that the animal requires from 7.0 to 7.93 pounds of total digestible nutrients to maintain her in good physical condition when she is not producing milk.

The requirements of the problem indicated, to wit, 1.32 to 1.51 pounds of protein and 12.22 to 13.45 pounds of total digestible nutrients for a cow producing 20 pounds of milk are solved by means of a plurality of computing elements in the form of scales, each of which is provided with graduations thereon defining spacings which are normally different from the spacings of the graduations on the other computing elements. These scales are referred to herein as computing elements and represent variable quantities of different feeds which contain different percentages of protein and of total digestible nutrients. There may be any desired number of computing elements used, but for the present problem it is sufficient to use the said two groups of computing elements designated E and F, and each group being composed of three scales. The scales in group E are designated 26, 27 and 28 and the scales in group F are designated 26', 27' and 28'. The said computing scales are used in pairs and for this reason they may be permanently connected together by any suitable means, for example a chain 29. In the present illustration the scale 26 and the scale 26' represent corn silage which contains one and three-tenths per cent (1.3%) of digestible protein and contains eighteen and seven-tenths per cent (18.7%) of total digestible nutrients; the scales 27 and 27' represent red clover which contains seven per cent (7.0%) digestible protein and fifty-one and nine-tenths per cent (51.9%) of total digestible nutrients and scales 28—28' represent barley which contains nine and three-tenths per cent (9.3%) digestible protein and seventy-eight and seven-tenths per cent (78.7%) total digestible nutrients. The several computing scales are based upon distances which are proportional to the total per cent value of the scales G and H and consequently of the linear distance upon which the spacing of the production measures 22—23 and 24—25 are based. For example the scale 26, as before indicated, contains only one and three-tenths per cent (1.3%) of digestible protein and consequently its total linear value is one and three-tenths per cent of the total linear value of scale G. This length of scale 26 is divided into percentage measures which consequently are proportional to the percentage measures of scale G in the same ratio as the total linear distance of scale 26 stands to the total linear distance of the fixed scale G. The total digestible nutrients of corn silage, as before indicated, is eighteen and seven-tenths per cent (18.7%). Consequently the scale 26' is based upon a total linear distance which is eighteen and seven-tenths per cent (18.7%) of the total linear distance of the fixed scale H. When the scale 26' is divided into one-hundred equal parts to represent percentage measures these measures will be proportional to the percentage measures of the fixed scale H in the same ratio as the total linear distance of scale 26' stands to the total linear distance of fixed scale H. It will now be seen that, if the scales 26 and 26' are arranged adjacent the graduations of the fixed scales G and H, the visible graduations on the scales 26—26' indicate the pounds of corn silage used in the ration, to wit, approximately twenty-seven (27) pounds and the graduations on the fixed scales G and H indicate, respectively, the pounds of protein and the pounds of total digestible nutrients, to wit, 0.35 pound of protein and 5.05 pounds of total digestible nutrients contained in the twenty-seven (27) pounds of corn silage used.

The scales 27—27', as previously indicated, represent red clover and are based upon linear distances corresponding to the percentages of the protein and the total digestible nutrients contained in this feed. The scale 27 is based upon a total linear distance of seven per cent (7.0%) of the total linear distance of scale G and the scale 27' is based upon a total linear distance of fifty-one and nine-tenths per cent (51.9%) of the total linear distance of fixed scale H. Inasmuch as the red clover carries a larger percentage of protein and a larger percentage total digestible nutrients than the said corn silage, a smaller amount of red clover will be used in the ration. The visible graduations on the scales 27—27' (Figs. 1 and 5) indicate that ten (10) pounds of red clover are used. The graduations on the fixed scale G for the distance of the visible portion of the scale 27 (Figs. 1 and 5) indicates that ten (10) pounds of red clover contain approximately seven-tenths (0.7) pound of protein. The graduations on fixed scale H for the visible length of scale 27' indicate that there are five and two-tenths (5.2) pounds of total digestible nutrients in the said amount of red clover used.

The third feed used in the ration is barley. It contains nine and three-tenths per cent (9.3%) of digestible protein and seventy-eight and seven-tenths per cent (78.7%) of total digestible nutrients. Consequently, the scale 28 which represents the protein content is based on a linear distance which is nine and three-tenths per cent (9.3%) of the total length of the fixed scale G. Also the said scale 28', representing the total digestible nutrients, is based upon a linear distance which is seventy-eight and seven-tenths per cent (78.7%) of the total length of the fixed scale H.

When the barley scales 28—28' are arranged to overlap the red clover scales 27—27' in the manner indicated in Figs. 1 and 5, the said scales 28—28' show that the use of three (3) pounds of this feed will provide approximately twenty-eight hundredths (0.28) pounds of protein; thereby making the total protein content of one and thirty-three hundredths (1.33) pounds for the three feeds. This amount of protein, therefore, meets the requirement of a cow of the weight and butter rating indicated on that part of chart A which is visible through the window C, when the cow is producing twenty (20) pounds of milk per day. The total digestible nutrients, to wit, two and thirty-five hundredths (2.35) pounds indicated on the scale H for the amount of barley used, makes the total digestible nutrients of the three feeds aggregate approximately twelve and six-tenths (12.6) pounds and therefore fully satisfies the requirement of the indicator 22' in window D, which indicator shows that the range of the total digestible nutrients for the ration should be between 12.22 pounds to 13.45 pounds for the 1,000 pound cow indicated on the chart B and visible through window D.

By inspection of Figs. 1 to 5 it will be observed that the three feeds contained in the ration aggregate approximately forty (40) pounds. A ration of this volume is about all that a cow of the weight and production rating indicated should eat. If the ration is prepared for a cow of the same weight, but producing more milk, the volume of feeds may be increased and additional feeds introduced into the ration to satisfy the protein and the total nutrient requirements indicated by the several production ratings designated by reference numerals 31, 32, 33 and 34 as shown on chart A and the reference numerals 31', 32', 33' and 34' shown on the total nutrient chart B and visible through the window D.

Figure 6:
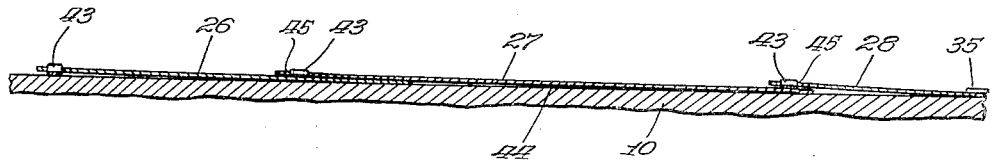
Fig. 6 is a fragmentary sectional view taken on line 6—6 of Fig. 5 to show the computing elements arranged in overlapped relation.
Figure 7:
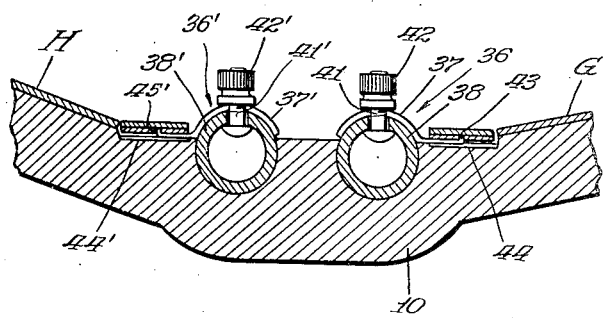
Fig. 7 is a fragmentary enlarged section taken on line 7—7 of Fig. 5.

It will be observed by inspection of Figs. 1, 5 and 6, that the overlapped computing scales of the separate groups E and F may be shifted in the direction of their length with relation to each other so as to vary the amount of the several feeds and also vary the amounts of protein introduced into the ration as a whole by the individual feeds, but the total amount of protein and the total digestible nutrients will remain the same.

The elements 35—35', shown in Figs. 1 and 5, are blank scale elements which function merely to cover the unused portions of the last computing scale used in the computation.

In order to simplify the lengthwise adjustments of the several computing scales and to retain them in proper relation to the fixed scales and to each other the scales are removably attached to adjustable slides 36—36'. All of the slides are of identical construction and comprise in each case of a semi-circular portion 37 which fits over the top surface of a tubular guide. The tubular guide associated with the group of computing scale I is designated 28 and is provided with a lengthwise slot 39. A screw bolt 41 is slidably positioned in the slot 39 and is provided with a thumb screw 42 which when tightened, clamps the slide 37 to the tubular guide and thereby maintains it in its adjusted position. The outer end of the guide is provided with an upturned portion 43 which fits into an elongated slot 45 formed in the forward end portion of the computing scale associated with the slide. It will be seen therefore that movement of the slide 36 along the guide 38 imparts corresponding movement to the computing scale attached to the slide. While the present disclosure makes use of only four of said slides, eight additional slides are shown at the right for use in connection with additional computing scales if desired. The slides designated 36' are associated with a tubular guide 38' which corresponds in construction to the guide 39, but is arranged adjacent the fixed scale H so that the slides 36' may be used in connection with the computing scales composing the group J.

In order to maintain the overlapped scales in alignment with the fixed scales G and H the top portion of the housing is preferably provided with shallow troughs 44—44'. The trough 44 is interposed between the guide 38 and the fixed scale G and the trough 44' is interposed between the guide 38' and the fixed scale H. The slide members 36' are removably connected to the several computing scales of group J by means of an upwardly extending lug 43' which extends through an elongated aperture. In the present disclosure the guide members 38—38' are shown in the form of tubes imbedded in the upper portion of the housing structure, but it will be obvious, when the housing is made of lighter material, the guide members can be formed as upwardly pressed corrugations.

I claim:

1. A computing machine comprising means provided with a classifying index which is positioned a predetermined distance from a fixed location, the said predetermined distance constituting a fractional portion of a fixed linear measure and representing, by its spaced location, a requirement index to be satisfied by the computation, and a plurality of computing elements in the form of scales movably overlapped one on another for collectively measuring the spaced position of said requirement index; each computing scale being provided with graduations thereon having spacings which are different from the spacings of the graduations on the other computing elements and represent like quantities having different values, each scale being based upon a total length which is proportional to said fixed linear measure and in the same ratio as the fractional distance represented by the spaced position of said requirement index stands to its measurement on the computing scale, whereby fractional portions of the quantities represented by the computing scales may be combined to satisfy said requirement index.

2. A computing machine comprising means provided with a plurality of classifying indexes each of which constitutes a portion of separate groups of indexes is positioned a predetermined distance from a fixed location on said means, the said predetermined distance constituting a fractional portion of a fixed linear measure and representing, by its spaced location, a requirement index to be satisfied by the computation, means for selectively displaying any one of said indexes to be used in the computation, and a computing element in the form of a scale provided with graduations thereon for measuring the spaced position of a selected requirement index; said scale being based upon a total length which is proportional to said fixed linear measure and in the same ratio as the fractional distance represented by the spaced position of the selectively displayed requirement index stands to its measurement on the computing scale.

3. A computing machine comprising means provided with a plurality of classifying indexes each of which constitutes a portion of separate groups of indexes is positioned a predetermined distance from a fixed location on said means, the said predetermined distance constituting a fractional portion of a fixed linear measure and representing, by its spaced location, a requirement index to be satisfied by the computation, means for selectively displaying any one of said indexes to be used in the computation, and a plurality of computing elements in the form of scales movably overlapped one on another for collectively measuring the spaced position of the selected requirement index; each of said scales being provided with graduations thereon having spacings which are different from the spacings of the graduations on the other computing elements and represent like quantities having different values, each scale being based upon a total length which is proportional to said fixed linear measure in the same ratio as the fractional distance represented by the spaced position of the selected requirement index stands to its measurement on the computing scale, whereby fractional portions of the quantities are represented, but the computing scales may be combined to satisfy the selected requirement index.

4. A computing machine comprising means provided with a plurality of aligned classifying indexes each of which is positioned a predetermined distance from a fixed location on said means, the said distance constituting a fractional portion of a fixed linear measure and representing, by its spaced location, the milk production of an animal of a known classification, and a plurality of computing elements in the form of scales representing feeds of different nutrient values movably overlapped one on another and provided with graduations thereon representing quantities of said feeds and adapted to collectively measure the spaced position of a selected milk production index each computing scale being provided with graduations thereon having spacings which are different from the spacings of the graduations on the other scales and is based upon a total length which is proportional to said fixed linear measure in the same ratio as the fractional distance represented by the spaced position of the selected production index stands to its measurement on the computing scales, whereby variable quantities of said feeds may be used to provide the desired nutrient value required to sustain said milk production.

5. An apparatus for computing the amount of nutrients contained in a feeding ration for dairy cattle comprising, in combination, means provided with a plurality of milk production indexes, each arranged a predetermined distance from a fixed location on said means, the said distance constituting a fractional portion of a fixed linear measure and representing the amount of nutrients required by a milch cow of known classification to maintain the milk production indicated by a selected index, and a plurality of computing elements in the form of linear scales representing feeds of different nutrient values and arranged in overlapped relation to collectively measure the spaced position of said selected index; each of said scales having graduations thereon defining spacings which are different from the spacings defined by the graduations on the other scales and are based upon a length which is proportional to said fixed linear distance in the same ratio as the amount of a selected nutrient in the selected feed stands to one-hundred pounds of such feed, whereby the visible graduations on the overlapped scales show the amounts of the respective feeds to be included in the ration and the visible linear distance of said overlapped scales represent nutrient values contained in the indicated quantities of the several feeds.

6. An apparatus for computing the amount of nutrients contained in a feeding ration for dairy cattle comprising, in combination, means provided with a plurality of milk production indexes, each forming a part of different groups and arranged a predetermined distance from a fixed location on said means, the said distance constituting a fractional portion of a fixed linear measure and representing the amount of nutrients required by a milch cow of known classification to maintain the milk production indicated by a selected index, means for selectively displaying any one of said indexes, and a plurality of computing elements in the form of linear scales representing feeds of different nutrient values and arranged in overlapped relation to collectively measure the spaced position of said selected index; each of said scales having graduations thereon defining spacings different from the spacings of the graduations on the other scales and is based upon a length which is proportional to said fixed linear distance in the same ratio as the amount of a selected nutrient in the selected feed stands to one-hundred pounds of such feed, whereby the visible graduations on the overlapped scales show the amounts of the respective feeds to be included in the ration and the visible linear distance of said overlapped scales represent nutrient values contained in the indicated quantities of the several feeds.

7. An apparatus for computing the amount of nutrients contained in a feed ration for dairy cattle comprising, in combination, means provided with separate groups of milk producing indexes, each group including a series of aligned indexes in which each index of the series is arranged a predetermined distance from a fixed location on said means, the said distance constituting a fractional portion of a fixed linear measure and representing the amount of protein required by a milch cow of known classification to maintain the milk production indicated by a selected index, means for selectively displaying any one of said groups of indexes, and a plurality of computing elements in the form of linear scales representing feeds of different nutrient values and arranged in overlapped relation to collectively measure the spaced position of a selected index; each of said scales having graduations thereon and based upon a length which is proportional to said fixed linear distance in the same ratio as the amount of the nutrient content of the feed stands to one-hundred pounds thereof, whereby the visible graduations on the overlapped scales show the amounts of the respective feeds to be included in the ration and the aggregate visible lengths of said scales represent the total nutrients contained in the total ration.

8. In apparatus for computing the amount of protein and the amount of total digestible nutrients contained in a feed ration for dairy cattle and composed of a plurality of feeds of different nutrient values, the combination of means providing a milk production index arranged a predetermined distance from a fixed location to indicate the amount of protein required by a milch cow of known classification to maintain the production indicated by said index and providing another index for like production arranged a predetermined distance from a fixed location to indicate the amount of total digestible nutrients required by said cow, means for simultaneously displaying said indexes, a group of computing elements in the form of linear scales overlapped one on another to collectively measure the spaced location of said protein index, another group of computing elements in the form of scales overlapped one on another to collectively measure the spaced position of the total nutrient index, each scale having graduations thereon indicating the amount of the several feeds used and the full per cent lengths of each scale comprising a linear distance which is proportional to the said linear measure in the same ratio as the considered nutrient in the feed stands to one-hundred pounds thereof, whereby the visible lengths of the scales of each group show the aggregate amount of the nutrient considered for that group.

9. In apparatus for computing the amount of protein and the amount of total digestible nutrients contained in a feed ration for dairy cattle and composed of a plurality of feeds of different nutrient values, the combination of means providing a milk production index arranged a predetermined distance from a fixed location to indicate the amount of protein required by a milch cow of known classification to maintain the production indicated by said index and providing another index of like production arranged a predetermined distance from a fixed location to indicate the amount of total digestible nutrients required by said cow, means defining spaced windows for displaying said indexes, means for simultaneously moving said indexes into the windows to be displayed therein, a group of computing elements in the form of linear scales overlapped one on another to collectively measure the spaced location of said protein index, another group of computing elements in the form of scales overlapped one on another to collectively measure the spaced position of the total nutrient index, and means including a guide and slidable elements thereon for adjustably supporting and retaining the several scales in their adjusted positions, each scale having graduations thereon indicating the amount of the several feeds used and the full per cent lengths of each scale comprising a linear distance which is proportional to the said linear measure in the same ratio as the considered nutrient in the feed stands to one-hundred pounds thereof, whereby the visible length of the scales of each group show the aggregate amount of the nutrient considered for that group.

10. In apparatus for computing the amount of protein and the amount of total digestible nutrients contained in a feed ration for dairy cattle and composed of a plurality of feeds of different nutrient values, the combination of means providing a milk production index arranged a predetermined distance from a fixed location to indicate the amount of protein required by a milch cow of known classification to maintain the production indicated by said index and providing another index of like production arranged a predetermined distance from a fixed location to indicate the amount of total digestible nutrients required by said cow, means defining spaced windows for displaying said indexes, means for simultaneously moving said indexes into the windows to be displayed therein, a group of computing elements in the form of linear scales overlapped one on another to collectively measure the spaced location of said protein index, another group of computing elements in the form of scales overlapped one on another to collectively measure the spaced position of the total nutrient index, and means including a guide and slidable elements thereon for adjustably supporting and retaining the several scales in their adjusted positions, each scale having graduations thereon indicating the amount of the several feeds used and the full per cent lengths of each scale comprising a linear distance which is proportional to the said linear measure in the same ratio as the considered nutrient in the feed stands to one-hundred pounds thereof, whereby the visible length of the scales of each group show the aggregate amount of the nutrient considered for that group, and a pair of graduated totalling scales arranged in fixed position relative to said windows and having legend graduations thereon to indicate the nutrient requirements of said indexes.

11. In apparatus for computing the amount of protein and the amount of total digestible nutrients contained in a feed ration for dairy cattle and composed of a plurality of feeds of different nutrient values, the combination of means providing a group of milk producing indexes including a series of aligned indexes representing the amount of protein required by a cow producing the amount of milk indicated in a selected index of said series, means providing another group of like indexes composed of a series of aligned indexes representing the amount of total digestible nutrients required by said cow to produce the milk indicated in said selected index, each of said indexes of each series being arranged predetermined distances from a fixed location, the several distances representing fractional portions of a fixed linear measure to indicate the amount of said protein and the amount of said total digestible nutrients required, means including a pair of operatively connected cylinders on which said groups of indexes are mounted to simultaneously display corresponding selected series of said indexes, a group of computing elements in the form of linear scales overlapped one on another to collectively measure the spaced location of a selected protein index, another group of computing elements in the form of scales overlapped one on another to collectively measure the spaced position of the total nutrient indexes, each of the said scales being based upon linear distances which are proportional to said linear measure and each provided with graduations representing equal percent divisions of the total length to indicate the contribution made of the several feeds used, a pair of totalizing linear scales having graduations thereon for totalizing the aggregate visible values of the measuring elements of both groups and arranged relative to the said production indexes so as to indicate the total amounts required by any selected index.

FREDERICK A. G. KOENIG.

REFERENCES CITED

The following references are of record in the file of this patent:

UNITED STATES PATENTS

| Number | Name | Date |
|---|---|---|
| 1,602,479 | Bulmer et al. | Oct. 12, 1926 |

FOREIGN PATENTS

| Number | Country | Date |
|---|---|---|
| 335,443 | Germany | Feb. 27, 1920 |